(12) United States Patent
Matychenkov

(10) Patent No.: US 7,879,127 B2
(45) Date of Patent: Feb. 1, 2011

(54) SILICON CONTAINING A MIXTURE FOR THE ACTIVATION OF THE PLANT NATURAL PROTECTION MECHANISMS AGAINST STRESSES

(75) Inventor: Vladimir V. Matychenkov, Doral, FL (US)

(73) Assignee: SIFEMA LLC, Wilmington, DE (US)

( * ) Notice: Subject to any disclaimer, the term of this patent is extended or adjusted under 35 U.S.C. 154(b) by 664 days.

(21) Appl. No.: 11/685,012

(22) Filed: Mar. 12, 2007

(65) Prior Publication Data

US 2008/0226530 A1 Sep. 18, 2008

(51) Int. Cl.
*C05D 9/00* (2006.01)
(52) U.S. Cl. .................. 71/62; 71/64.1; 71/903
(58) Field of Classification Search .......... 71/903, 71/62, 64.1
See application file for complete search history.

(56) References Cited

U.S. PATENT DOCUMENTS 4,670,288 A * 6/1987 Ikari et al. .................. 427/4
4,948,413 A * 8/1990 Maekawa et al. .......... 504/117
2004/0089042 A1 * 5/2004 Henderson .................. 71/21

* cited by examiner

*Primary Examiner*—Wayne Langel
(74) *Attorney, Agent, or Firm*—Notaro, Michalos & Zaccaria P.C.

(57) ABSTRACT

A product for reinforcing the natural plant defense system a mixture of one or several silicon-rich substances (A), one or more activators of plant immune system (B) and substance (C) which supply to (A) and (B) activity. Activators are substances or physical effects and substances, which transport the information about stress and provide the synthesis of non specific and/or specific stress-proteins, stress ferments and other stress-protecting substances to the plant cells. Using various forms of Si-rich substances will help plants to synthesize non-specific, specific substances and ferments which protect plants against stress. The substance (C) could serve for optimization of plant growth or for reinforcing Si or the activator component and they can be added to the new product also. The application of all these ingredients can be conducted via soil application (both broadcasting and incorporation) together with the irrigation water, by foliar applications or as dust application. The application of all the ingredients can occur together or separately at intervals, which can't be longer then 6 months.

10 Claims, No Drawings

SILICON CONTAINING A MIXTURE FOR THE ACTIVATION OF THE PLANT NATURAL PROTECTION MECHANISMS AGAINST STRESSES

FIELD OF THE INVENTION

This invention relates to silicon compounds and their use in agriculture.

BACKGROUND TO THE INVENTION

It is well known, that the mechanism of natural plant protection against any stress has chemical basis (Zaitlin and Palukaitis, 2000). Plants have a non-specific defense system, which is realized by synthesizing non-specific stress-ferments and a gene-controlled defense system, which is realized by synthesizing the specific and non-specific stress-proteins controlled by genetic information (Tarchevsky, 2001). The system of plant protection mechanisms is initiated through the following process. Stress effects plant cells either physically or chemically. This effect activates the signal system (formation of the special signal molecules) of the cell, which transforms the information about stress to plant nucleolus and other plant organelles, which control plant metabolism. After receiving the information of incoming stress, processes for synthesizing non-specific stress ferments begin. If the nucleolus of the plant can recognize the type of stress, using the specific signal system, than the nucleolus will find the information in the DNA about the specific stress protein synthesis that is necessary. The information RNA transforms this information sending new orders to organelles, which start to synthesize the right stress proteins. The newly synthesized specific and non-specific stress-proteins than move to the stress location and reduce the negative influence of the stress or of the attacks of the stress factor (Tarchevsky, 2001).

The key factor for successfully protecting plants against stress is to provide the right and timely information about stress, which is generated by a chemically based system. Specific or nonspecific signal molecules transport the information between stress locale and area of non-specific stress ferments synthesis, between stress locale and gene-apparatus and between gene-apparatus and area of specific stress ferments synthesis (Tarchevsky, 2001). Scientific research has demonstrated that when plants are treated by substances or by physical effects, which initiated or simulated stress or by substances which informed organisms about stress, this results in the formation of specific and non-specific stress-proteins and other stress-protecting substances without the real stress (Tarchevsky, 2001; Montesinos et al., 2002; Struszczyk et al., 2005). The effect of plant "hardening" resulting from the treatment of plants with low levels of stress is a well known mechanism. As a result the plant immune system is ready for the stress and the plant can thus protect itself much more efficiently against damage from the incoming real stress. This means that it is possible to initiate (trigger) the plant defense mechanism (before the actual attacks by dangerous stress), by using low levels of stress simulations which prepare and ready the organisms to increase the plant's resistance against the anticipated incoming real and dangerous stress. The substances that can do this, will be called activators.

The second component of the background of the invention is: biogeochemically active Si. There is much available data, which show that the application of Si fertilizers or Si soil amendments increases plant resistance against stresses (Snyder et al., 2006). There are also many explanations that are available regarding the actual mechanism of Si effect on plant's increased resistance against stresses. This increased resistance is either due to the accumulation of absorbed Si in the epidermal tissue, or the expression of pathogenesis-induced host defense responses (Snyder et al., 2006). Accumulated monosilicic acid polymerizes into polysilicic acid and then transforms to amorphous silica, which forms a thickened Si-cellulose like membrane which can be associated with pectin and calcium ions (Hudson, Sangster, 1988). This means, that a double cuticular layer protects and mechanically strengthens the plants (Ma, Takahashi, 2002). Silicon may also form complexes with organic compounds in the cell walls of epidermal cells, thus increasing their resistance to degradation by enzymes released under stresses. However, the investigation has shown that the reinforcement of the mechanical plant protection can provide only a portion of the plant defense, initiated by Si fertilizers (Belanger, 2005). Our research and research conducted by other scientists have demonstrated that a biochemical mechanism exists for plant protection, which is triggered when soluble Si compounds are applied to the plant (Matichenkov, Bocharnikova 2004). Considering that the application of Si fertilizers increases the content of antioxidants in plants (Belanger, 2005; Snyder et al., 2006) and polysilicic acid can be used for the protection of plants against low temperatures via synthesis of the organic molecules (Banerjee, 2001) the following hypothesis can be formulated: Si can control the synthesis of stress-proteins and other substances for plant protection against stresses. (Matichenkov, Biel, 2006).

The integration of two constituents is the base of the subject hypothesis and invention: (a) starting with special substances' synthesis (enzymes of antioxidant defense, stress proteins, etc.) as the answer of the genetic apparatus in living systems (any plants) to stresses, and (b) additional non enzyme synthesis of the same substances on the polysilicic acid matrix. In this case, a silicic matrix structure is specified by proteins, which were primary synthesized by the genetic apparatus. The function of the Si-matrix, in the defense system, is making additional synthesis of stress proteins without the direct participation of the genetic apparatus and this can explain the known phenomenon of why Si is a protection agent. This means that Si-base synthesis saves living organisms (plants) a lot of energy, thus providing more resistance to stresses.

The hypothesis formulated here together with basic information about the function of the natural plant defense system, which was described above, open the way for new products for increasing natural plant defenses, against any stress, according to the present invention.

SUMMARY OF THE INVENTION

A new product that reinforces natural plant defense system against any stress, is thus suggested. This product is a mixture of silicon-rich substances, activators of plant immune system and/or substances for the reinforcement of both previous components. Activators are substances or physical effects, which transport the information about stress and provide the synthesis of non specific or/and specific stress-proteins, stress ferments and other stress-protecting substances by the plant cell. The silicon part of the new product provides the additional Si plant nutrition, under simulation of the stress by activators, which provides the formation of polysilicic matrix for the replication of stress proteins without the direct participation of the genetic apparatus. This polysilicic matrix is kept in the plant cell providing reinforcement of the plant immune system. The new product can be modified by using various forms of Si-rich substances, activators and other substances, which will help plants to protect themselves against stress.

The application of all these ingredients can be conducted via soil application (both broadcasting and incorporation) together with irrigation water, by foliar application and as dust application or via fumigation. The application of all the ingredients can be done all together or separately with some interval, which cannot be longer then 6 months.

DESCRIPTION OF THE PREFERRED EMBODIMENTS

The new product that reinforces the natural plant defense system comprises two main components (A and B) and of addition substances. Part (A) is at least one SI-rich component and part (B) is at least one activator of the plant-defense system.

Part (A) can be comprised of one or more Si-rich liquid/jell or solid soil substances, which can provide Si plant nutrition for the synthesis of Si-matrix in plant cells and given in water solution under pH of 1 to 14, with the concentration of monosilicic acid from 10 to 1000 ppm of Si and more.

Part (B) can comprise one or more substances or physical effects and substances, which transport the information about stress and provide the synthesis of non specific or/and specific stress-proteins, stress ferments and other stress-protecting substances in plant cell. The chemical or physical effects are such events as low temperatures, high temperatures, wind, strong light or weak light.

The additional substances (C) to this formula of the new product may be added for several reasons: to increase the stability of the activators, optimization of the physical properties of the mixture of (A) and (B) or of the separate parts (A) and (B) (for example surface-active material), materials for better adaptation of plants against stress and for optimization of plant nutrition or plant growth. These substances do not provide Si plant nutrition or activate the plant immune system.

Part (A), part (B) and the additional substances can be mixed together and applied to the soil (both by broadcasting or incorporation), or to the soil or to the plant with irrigation water or nutrient solution, to the plant by foliar or fumigation application and to the plant by dusting in solid form, gas form, liquid form, jell form or together with water or solution, where water or solution can be used as the additional substances. The ratio between (A) and (B) can range from 1:100,000 to 1,000,000:1.

Part (A) and part: (B) with or without additional substances can be applied separately to soil (both by broadcasting or incorporation), to soil or to plant with irrigation water or nutrient solution, to plant by foliar or fumigation application and to plant by dusting in solid form, gas form, liquid form, jell form or together with water or solution, where water or solution can be used as additional substances. Time period between application of the part (A) and part (B) with or without additional substances, must be less then 6 months.

The additional substances for reinforcing part (A) and (B) together or part (A) or part (B) separately, can be added and mixed with (A) or (B) separately or with a mixture of (A) and (B). The content of additional substances can range from 0.001% to 99.999% of the total mass or volume of the new product.

The following Example illustrates the invention.

EXAMPLES

Example 1

This experiment was conducted in the greenhouse, using sandy soil. Cauliflower was used as the test plant. Diatomaceous Earth (DE) from North-East Australia (Pallkarra) a silicon-rich material was used as Si fertilizer. The chemical composition of this material is presented in table 1

TABLE 1

Selected properties of DE.

| Material | pH ($H_2O$) | Ca, % | Fe, % | Al, % | Si, % |
|---|---|---|---|---|---|
| DE | 7 | 0.2-0.3 | 1-2 | — | 34-36 |

DE was grounded to dust size (0.01-0.02 mm). The salicylic acid, chitin and abscisic acid, were used as activators. Salicylic acid is recognized as an universal activator of plant immune system (Montesinos et al., 2002). Chitin is recognized as an activator of plant immune system against insect attacks (Struszczyk et al., 2005) and abscisic acid is recognized as an activator of plant immune system against water deficiency (Jakab et al., 2005). The selected activators were mixed with DE in the following proportions: DE:salicylic acid=1000:1 (A), DE:Chitin=1000:1 (B), DE:abscisic acid=10000:1 (C), DE:salicylic acid:chitin:abscisic acid=10000:10:10:1 (D). All the mixtures and DE were mixed with water in the proportion 100 g of solid material per 1 liter of bi-distilled water and shacked. The selected activators also were used without DE. The activators were mixed with water in the following proportions: salicylic acid:water-1:10000 (F), chitin:water=1:10000 (G), abscisic acid:water=1:100000 (H) and salicylic acid:chitin:abscisic acid:water=10:10:1:100000 (K).

Cauliflower was seeded into plastic pots (1 liter volume) with sandy soil (5 seeds per pot). After 1.5 weeks after seeding the plants were treated with preparer solutions. The control 1) was treated only with distilled water and control 2) was treated with a mixture of DE with water in the proportion of DE:water=1:10. Each treatment had four pots for replications. Totally each treatment had 20 plants. The greenhouse was infected by green-louse (*Aphidae*). 2.5 weeks after treatment the amount of infection by insect leaves was calculated. The statistic proceeding was used to determine the standard deviation. The obtained data is presented in Table 2.

TABLE 2

Effect of DE and Activated DE on the % of cauliflower leaves infected by louse-plant.

| Treatment | No activators | salicylic acid | chitin | abscisic acid | salicylic acid + chitin + abscisic acid |
|---|---|---|---|---|---|
| Control | 79 | 78 | 73 | 77 | 75 |
| DE | 54 | 31 | 11 | 54 | 9 |
| St. deviation | 4 | 4 | 4 | 4 | 4 |

The results demonstrated that by applying only DE, it significantly reduced the % of infected leaves of cauliflower by louse-plant (Table 2), while the application of only activators has no significant effect on the level of infection. The activation of DE by salicylic acid, chitin or a mixture of all activators, dramatically increased the effect of DE on the level of plant infection by insects. The activation of DE by abscisic acid had no effect compared with plants treated by DE only. This means that the activation of Si fertilizer by the universal activator (salicylic acid), which is part of the information plant system for initiation of the non specific stress-protein synthesis, reinforces the effect of DE on the plant protection system. The activation of DE by chitin, which is a recognized substance for the initiation of the plant defense system against insect attacks, also reinforced the plant defense system. The activation of DE by abscisic acid, which is recognized as a substance that increases the plant against drought and water deficiency had no effect compare with only DE application, because abscisic acid activated only the synthesis of stress-protein for increasing the plants resistance against drought.

Example 2

The experiment was conducted in the greenhouse with sandy soil. Barley ("Moscow 9") was used as test plant. Amorphous silicon dioxide (chemically pure grade $SiO_2$, with surface area 300 $m^2/g$ was used as Si-rich part of the new product. The salicylic acid, chitin and abscisic acid were used as activators. The selected activators were mixed with $SiO_2$ in the following proportions: $SiO_2$:salicylic acid=1000:1 (A) $SiO_2$:Chitin=1000:1 (B), $SiO_2$:abscisic acid=10000:1 (C), $SiO_2$:salicylic acid:chitin:abscisic acid=10000:10:10:1 (D). All the mixtures and $SiO_2$ were added to water in the proportion of 100 g of solid material per 1 liter of bi-distilled water and shuffled. The selected activators were also used without $SiO_2$. The activators were mix with water in the following proportions: salicylic acid:water=1:10000 (F), chitin:water=1:10000 (G), abscisic acid:water=1:100000 (H) and salicylic acid:chitin:abscisic acid:water=10:10:1:100000 (K). In addition to chemical activators physical activator was also used in this example. There was also a low temperature shock exposure for a short period (30 minutes at 0° C. after 2 weeks of plant growing). This shock was used without any another substance application (L), $SiO_2$+ low temperature shock (M), low temperature shock plus salicylic acid:chitin:abscisic acid:water=10:10:1:100000 (N) low temperature shock plus $SiO_2$:salicylic acid:chitin:abscisic acid 10000:10:10:1 and (O).

Barley was seeded into plastic pots (1 liter volume) with sandy soil (20 seeds per pot). After 3 weeks of growing in sandy soil, under normal conditions (20-24° C., optimum irrigation), the following materials were applied. After 4 weeks some of the pots were placed into a climatic chamber, with temperature between 8-12° C. for one week for initiation low temperature shock. Irrigation was halted on another part of the plants to simulate drought stress and the other part of the plants was kept under normal watering condition. Barley was grown for an addition one week and at the end of the week, the plants were harvested.

TABLE 3

Effect of $SiO_2$ and Activated $SiO_2$ on the biomass of barley under favorable condition (g for 10 plants)

| Treatment | No activators | salicylic acid | chitin | abscisic acid | salicylic acid + chitin + abscisic acid | Low temperature shock | Low temperature shock + salicylic acid + chitin + abscisic acid |
|---|---|---|---|---|---|---|---|
| Control | 1.25 | 1.24 | 1.26 | 1.22 | 1.25 | 1.24 | 1.23 |
| $SiO_2$ | 1.58 | 1.53 | 1.54 | 1.49 | 1.51 | 1.5 | 1.47 |
| St. deviation | 0.05 | 0.06 | 0.1 | 0.05 | 0.05 | 0.05 | 0.05 |

The application of both $SiO_2$ and activated $SiO_2$ has positive influence on the barley, grown under normal conditions (Table 3). In these treatments the biomass increased from 12 to 18%, which can be explained by the positive influence of Si. The application of only activators has no significant effect on the barley biomass (Table 3).

The simulation of low temperature stress increased the effect of $SiO_2$ application and the effect of $SiO_2$ application together with activators, increased the effect on the biomass of barley (Table 4). The universal activator (salicylic acid) and specific activator (low temperature shock) had maximum positive influence on barley, while the application of $SiO_2$ with another tested activators had the same effect of only $SiO_2$. The application of only activators has no significant influence on barley biomass.

TABLE 4

Effect of $SiO_2$ and Activated $SiO_2$ on the biomass of barley under low temperature stress (g for 10 plants)

| Treatment | No activators | salicylic acid | chitin | abscisic acid | salicylic acid + chitin + abscisic acid | Low temperature shock | Low temperature shock + salicylic acid + chitin + abscisic acid |
|---|---|---|---|---|---|---|---|
| Control | 1.16 | 1.12 | 1.15 | 1.11 | 1.12 | 1.2 | 1.22 |
| $SiO_2$ | 1.38 | 1.49 | 1.35 | 1.4 | 1.38 | 1.57 | 1.59 |
| St. deviation | 0.05 | 0.06 | 0.1 | 0.05 | 0.05 | 0.05 | 0.05 |

The experiment with water deficiency showed the same effect (Table 5). The application of $SiO_2$ had positive influence on the barley. The application of $SiO_2$ with universal activator (salicylic acid) or application of $SiO_2$ with abscisic acid reinforced the effect of active Si application. The application of the $SiO_2$ with other specific activators had the same effect as only $SiO_2$ application (Table 5).

TABLE 5

Effect of $SiO_2$ and Activated $SiO_2$ on the biomass of barley under water deficiency stress (g for 10 plants)

| Treatment | No activators | salicylic acid | chitin | abscisic acid | salicylic acid + chitin + abscisic acid | Low temperature shock | Low temperature shock + salicylic acid + chitin + abscisic acid |
|---|---|---|---|---|---|---|---|
| Control | 0.47 | 0.51 | 0.38 | 0.44 | 0.49 | 0.51 | 0.52 |
| $SiO_2$ | 1.24 | 1.38 | 1.20 | 1.48 | 1.52 | 1.25 | 1.49 |
| St. deviation | 0.05 | 0.06 | 0.05 | 0.05 | 0.05 | 0.05 | 0.05 |

The obtained data has demonstrated that our theoretical investigations about the possibility to Activate Si fertilizers, with Specific or Non-specific Activators works.

LITERATURE CITED

Banerjee A. K., Laya Mimo M. S., Vera Vegas W. J. Silica gel in organic synthesis 2001 *Russian Chemical Reviews.* 70 (11): 971-990.

Belanger R. R. 2005 The role silicon in plant-pathogen interaction: toward universal model. *In: III Silicon Agricultural conference.* (ed.) Koradorfer G. H., Oct. 22-26, 2005, Umberlandia, Universodade Federal de Uberlandia.- 2005.-P. 34-40.

Hodson M. J., Sangster A. G. 1988. Silica deposition in the influence bracts of wheat (*Triticum aestivum*). 1 Scanning electron microscopy and light microscopy. *Can. J. of Botany* 66(5):829-837.

Jakab G., Ton J., Zimmerli V. L., Métraux J. P. and Mauch-Mani B. 2005. Enhancing *Arabidopsis* Salt and Drought Stress Tolerance by Chemical Priming for Its Abscisic Acid Responses. *Plant Physiology* 139:267-274

Ma J. F., Takahashi E. 2002. *Soil, fertilizer, and plant silicon research in Japan,* Elsevier, The Netherlands. 281 pp.

Matichenkov V. V., Bocharnikova E. A. 2004. Si in horticultural industry. *In:* (eds) *Dris R, Jain S. M. Plant Mineral Nutrition and Pesticide management,* v. 2., 217-228.

Montesinos E., Bonaterra A., Badosa E., Francer s J., Alemany J., Llorente I., Moragrega C. 2002. Plant-microbe interactions and the new biotechnological methods of plant disease control. *Int Microbiol* 5: 169-175

Struszczyk, H., Domarad, A., Peter, M. G., Pospieszny, H. (Eds.). 2005. *Advances in Chitin Science.* Volume 8, 503 pp.

Snyder G. H., Matichekov V. V. Datnoff L. E. 2006. Silicon In: *Handbook of Plant Nutrition,* Massachusetts University, 551-568.

Tarchevsky I. A. 2001. *Plant metabolism under stress.* Russian Academy of Sciences, "Fen", Kazan, pp. 448.

Zaitlin M, and P Palukaitis. 2000. Advances in understanding plant viruses and virus diseases. Annu Rev Phytopathol 38:117-143.

The invention claimed is:

1. A composition for activating a natural protective mechanism of a plant comprising a mixture of three components: a first one of the components being a nutritional silicon-rich substance (A); a second one of the components being an activator in an amount for providing an activation of a plant natural protection mechanism (B) and being selected from the group consisting of: salicylic acid; chitin; and abscisic acid; and a third one of the components (C) being an additive and being in an amount of from 0.001% to 99.999% by mass of the total composition and being for stabilizing at least one of the first nutritional component (A) and the second activator component (B), the third component (C) providing no more silicon and no more activator to the composition.

2. The composition according to claim 1, wherein the first component (A) is supplied in an aqueous mixture at pH of 1 to 14 and in a ratio of first to second component (A:B) of 1:100,000 to 1,000,000:1.

3. The composition according to claim 1, wherein the second component (B) is salicylic acid, chitin and abscisic acid together.

4. The composition according to claim 1, wherein (B) is salicylic acid, chitin and abscisic acid together.

5. The composition according to claim 1, wherein (B) is only one of salicylic acid or chitin or abscisic acid.

6. The composition according to claim 1, wherein the components (A) and (B) are respectively $SiO_2$ for (A) and salicylic acid, chitin and abscisic acid together for (B) in a respective ratio of 10,000:10:10:1.

7. The composition according to claim 1, wherein a ratio between the first and second components (A) and (B) is in the range from 1:100,000 to 1,000,000:1 and the first component (A) is selected from the group consisting of: $SiO_2$ and diatomaceous earth.

8. The composition according to claim 1, wherein (C) is an inorganic or organic substance.

9. The composition according to claim 1, wherein a ratio of (A) plus (B) and (C) is in the range of from 1:1,000,0000 to 10,000:1.

10. The composition according to claim 1, wherein the mixture is $SiO_2$ or diatomaceous earth for component (A) and water for component (C).

* * * * *